United States Patent [15] 3,673,517

Ticknor [45] June 27, 1972

[54] RESISTORLESS RADIO FREQUENCY HYBRID SIGNAL SPLITTER

[72] Inventor: Sergei L. Ticknor, Earlville, N.Y.

[73] Assignee: Jerrold Electronics Corporation, Philadelphia, Pa.

[22] Filed: Sept. 19, 1968

[21] Appl. No.: 760,751

[52] U.S. Cl. ....................................333/8, 325/308, 333/11
[51] Int. Cl. ....................................................H03h 7/48
[58] Field of Search ......................333/8, 6, 11, 24; 325/308; 307/17

[56] References Cited

UNITED STATES PATENTS

| | | | |
|---|---|---|---|
| 3,454,905 | 7/1969 | Winegard | 333/8 |
| 2,700,129 | 1/1955 | Guanella | 333/8 UX |
| 2,924,673 | 2/1960 | Dainker | 333/11 X |

*Primary Examiner*—Paul L. Gensler
*Attorney*—Sandoe, Hopgood and Calimafde

[57] ABSTRACT

A radio frequency signal splitter is described wherein a hybrid coil utilizes a ferrite core whose RF resistance is selected bearing predetermined ratios to the characteristic impedances of the RF input and RF output lines. Several embodiments are described.

8 Claims, 10 Drawing Figures

INVENTOR.
SERGEI L. TICKNOR

BY

Hopgood & Calimafde
ATTORNEYS

INVENTOR.
SERGEI L. TICKNOR
BY
Hopgood & Calimafde
ATTORNEYS

INVENTOR.
SERGEI L. TICKNOR
BY
Hopgood & Calimafde
ATTORNEYS

RESISTORLESS RADIO FREQUENCY HYBRID SIGNAL SPLITTER

This invention relates to a radio frequency (RF) impedance matching device. More specifically, it relates to a hybrid radio frequency signal splitter for impedance matching of an RF input line to several RF output lines over a wide frequency band.

In the transmission of signals of television frequencies, it is quite often necessary to connect subscribers to a coaxial cable at selected intervals. The interconnection cannot be simply made as is done in conventional low frequency electrical circuits such as used in the wiring of homes, since a direct connection of branches as practiced in the low frequency circuits would produce undesirable disturbances in the radio frequency cable system. This problem has long been recognized as evidenced by the numerous treatises and textbooks dedicated to the field of "transmission line theory." An RF signal splitter which couples an RF input signal to several RF outputs with a minimum of wave reflections and high isolation between RF outputs has been developed to couple for instance an antenna to several receivers.

Several good engineering practices are observed when one seeks to design a radio frequency signal splitter. A first engineering requirement is that the characteristic impedances of the several RF lines to be interconnected are properly matched by the signal splitter. The characteristic impedance of an RF line is the effective impedance an RF signal "sees" when entering a long RF transmission line such as a coaxial cable or a balanced twin-lead line. If the characteristic impedances are not properly matched, standing waves result on the line causing an effective loss of the RF input signal. Where, for instance, a plurality of signal splitters are used along a coaxial cable, the poor matching of the characteristic impedances to the RF input line as well as to the RF output line will quickly reduce the effectiveness of the RF signal distribution to subscribers requiring expensive repeater amplifiers and rendering the system uneconomical.

A second engineering requirement is that the splitter provide a low loss in signal. Although good matching of characteristic impedances will reduce losses close to the theoretical minimum, the components used inside a signal splitter must also be carefully selected to minimize the losses. The need for low RF losses may be especially appreciated during the reception of weak television signals. If such weak antenna signals are to be split to drive several TV receivers, it can be realized that, lest the losses are kept low, the receivers will be unable to supply an adequate picture.

In a typical multiple TV receiver system driven by a common receiving antenna, it is often observed that the control of one receiver, such as the tuning to different channels, will cause flicker effects on the other receiver. It is not uncommon that the use of one receiver effectively blocks or interferes with the reception of the other receiver where both are driven by a common antenna. Another requirement for the RF signal splitter, therefore, is to provide a high isolation between RF output channels, so that a disturbance produced by one receiver cannot affect the picture of the other receiver driven by the same splitter.

In a prior art signal splitter such as shown in FIG. 1, an RF input signal is to be split into several RF output signals. A conductive housing 10 encloses a hybrid coil 12 of the autotransformer type having a pair of end terminals 14 and 16 and a center tap 18. The coil 12 is wrapped about a ferrite core 20 which is selected for its high resistivity throughout the frequency range within which the splitter is operated. The hybrid coil 12 and core 20 are mounted to the housing by non-conductive supports of conventional type and which are deleted from the figure for clarity. The end terminals 14 and 16 are respectively coupled to the central conductors 22 and 24 of RF output coaxial cables 26 and 28 through apertures in the housing 10. The center tap 18 is coupled to the central conductor 30 of RF input coaxial cable 32. The RF output cables have a characteristic impedance R2 and R3 ohms and the RF input cable has a characteristic impedance of R1 ohms. A resistor 34 of R4 ohms is applied between the end terminals 14 and 16 to obtain proper impedance matching as explained below.

FIG. 1A is a schematic representation of the signal splitter of FIG. 1 without the ground connections. According to well known transformer theory and descriptions of the balanced hybrid coil signal splitter, the circuit sections between the end terminals and the center tap are balanced with respect to each other. A voltage E applied between the center tap 18 and ground causes equal currents to flow in opposite directions through the two halves of the coil 12 and therefore produces zero voltage across the resistor 34. As a result, the voltage E arrives undiminished at the end terminals 14 and 16. Although desirable, it is not essential that R2 equal R3 but if they are not equal, then the number of turns between the end terminals and the center tap 18 must be correspondingly changed; e.g. if R2 is twice that of R3, then the number of turns connected to the coaxial cable 26 should be twice those connected to coaxial cable 28. It is important that through the range of frequency in which the signal splitter is to function, the balance between the halves of the coil 12 be maintained closely with the most exact balance being achieved for R2 equal to R3. It can be shown that if R2 equals R3 and R4 is twice that of R2 and R1 is one-half of R2 that the best matching conditions are obtained whereby the RF input line sees its own characteristic impedance and the RF output lines see their characteristic impedances when looking backwardly towards the end terminals. The transfer function between RF output lines, i.e. the degree of isolation between RF output lines is then such that very little coupling between output lines can occur.

To illustrate this isolation between the RF output lines, suppose an RF signal were to travel towards end terminal 16 from the RF output cable 28. The signal would "see" the effect of two like impedance paths in parallel. The first path would be via the external resistance 34 to the end terminal 14 as shown by arrow 36 and the other is a path as shown by the arrow 38 through the hybrid coil 12 to the center tap 18 and continuing with a reversal in phase thereafter to the end terminal 14. The signals after passage through these paths arrive at RF output line 26 equal in amplitude but opposite in phase — thus cancelling one another with the result that signals present on RF output line 28 are unable to interfere with and pass onto RF output line 26.

The external resistor 34 used in the prior art introduces several disadvantages. To wit, the effective RF resistance of the resistor is not sufficiently constant over wide frequency bandwidths required by present TV communications, i.e. 54 to 890 MHz. As a result, imbalances are introduced in the hybrid coil tending to severely mitigate the desired isolation over the frequency band. Furthermore, the core material used with the fixed external resistor must be selected to provide an RF core resistance which is as high as possible to avoid degrading of the external resistor and thus the balance of the splitter. Since the core resistance usually decreases with frequency, the effectiveness of the isolation at the high end of the band is altered by core material which effectively shunts this external resistance.

I have discovered a new radio frequency signal splitter wherein the high frequency deteriorating effects of prior art splitters are avoided and a component, the external resistance, may be eliminated.

It is therefore an object of this invention to provide a radio frequency signal splitter which is operable with excellent characteristics over a wide frequency band.

It is a further object of this invention to provide a radio frequency signal splitter which is simple in construction and economical to make by eliminating a component.

It is still further an object of this invention to provide a radio frequency signal splitter which has a high isolation between RF outputs throughout a wide frequency bandwidth.

It is a further object of this invention to provide a signal splitter utilizing a high permeability core material to provide a wide bandwidth effective radio frequency signal splitter.

The above-mentioned and other features and objects of this invention and the manner of attaining them will become more apparent and the invention itself will best be understood by reference to the following description of embodiments of the invention taken in conjunction with the accompanying drawings, the description of which follows.

Briefly stated, my invention contemplates forming a hybrid radio frequency signal splitter for the impedance matching of an RF input line to several radio frequency output lines over a wide preselected frequency band and wherein a radio frequency ferrite core having a selected radio frequency resistance with respect to the characteristic impedance of the RF lines is used with a coil having a pair of end terminals and an intermediate terminal which are arranged for coupling to the RF input and output lines to obtain the desired impedance matching and isolation between RF output lines.

Figures 1, 1A, 2, 2A:
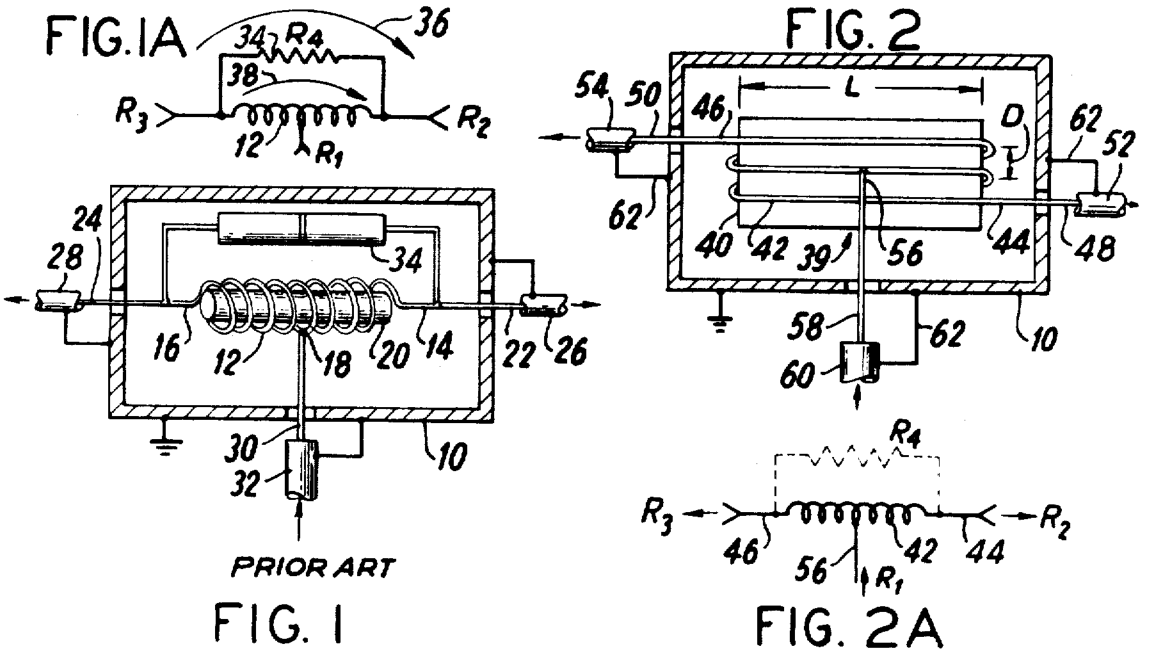
FIGS. 1 and 1A are respectively a partial section perspective view and a schematic representation of a prior art hybrid coil radio frequency signal splitter.
FIGS. 2 and 2A are respectively a partial side view and a schematic representation of a radio frequency signal splitter in accordance with this invention.

In FIG. 2, a conductive housing 10 is shown enclosing a hybrid coil 39 including a ferrite coil 40 in a cylindrical shape provided with a bore (not visible in the view of FIG. 2) extending between the axial ends of the core. The core is mounted to the housing by a suitable insulating post, not shown. A coil 42 having a preselected number of turns is wound around the wall of the core with its winding substantially parallel to the axis of the core. The coil has a pair of end terminals 44 and 46 which project from opposite axial ends of the core and are connected respectively to the center conductors 48 and 50 of two coaxial cable RF output lines 52 and 54. At the electrical center of the coil 42, an intermediate tap 56 is provided for connection to the center conductor 58 of a coaxial RF input line 60. The intermediate tap or terminal 56 is usually located about the axially centered location of the core. The coaxial cables 52, 54, 60 each have their outer conductors 62 connected to the housing 10.

FIG. 2A illustrates a schematic representation of the structure of FIG. 2 wherein the coil 42 forms an auto transformer having a pair of end terminals 44 and 46 and a center tap 56. The RF output lines 52 and 54 have a characteristic impedance respectively of R2 and R3 ohms and the characteristic impedance of the coaxial RF input line 60 is R1 ohms. The ferrite core is selected to provide an RF resistance represented by the resistor R4 shown in phantom fashion connected across the end terminals 44 and 46 of the coil.

The ferrite core material is selected to provide a substantially constant resistivity over the frequency band for which the splitter is to operate. Its permeability and other factors necessary for it to function as a wide band hybrid reversing transformer must be met. A typical material which would meet these qualifications would be such as is provided by the Stackpole Carbon Company with its ceramag 7D material. The inside diameter of such material is about 0.036 inches and outside diameter is approximately 0.047 inches to yield a thickness of core material of approximately 0.118 inches. Such material will exhibit a change in resistance loss by a factor of approximately 1.6 over a frequency range of 55 to about 260 MHz. Such a change in the resistive loss is acceptable for the purposes of a hybrid coil design used with this invention.

The length L of the corP is selected to provide a resistance R4 which bears a preselected relationship to the characteristic impedances of the RF lines connected to the coil. As previously mentioned in relation to FIG. 1, the preferred ratios of the impedances R1, R2, R3 and R4 are respectively 1 to 2 to 4. The length L of the coil is thus selected to provide an RF resistance which is twice that of the characteristic impedance of the RF output lines 52 and 54 and four times the value of the characteristic impedance of the RF input line 60.

In the event the coaxial cable RF input line 60 has a characteristic impedance of about 37 ½ ohms and the characteristic impedance of the RF output lines 52 and 54 are each 75 ohms then the length L is selected to provide a 150 ohm shunting RF resistance R4 across the end terminals 44 and 46 of the coil. The resistance R4 is not entirely dependent upon the length of the core but to some extent is also a function of the number of loops of the winding, bearing in mind that additional windings will result in a reduced resistance R4. The selection of the core size, the number of windings used, as well as the spacing D between the windings, are important factors which affect the response of the hybrid coil. It is not a simple matter to provide a particular rule of thumb that would be applicable to all designs of radio frequency hybrid signal splitters, and it is always simpler, as one skilled in the art will appreciate, to select these several design parameters empirically. It should further be noted that the cylindrically shaped core can be replaced by a toroid or a ring-like or solid cylindrical core with the alterations in the winding to be made according to the above-suggested approaches.

It can be appreciated that with a hybrid coil 39 of the type shown in FIG. 2, the resistance R4 may be represented not by a lump constant as is done in the prior art device but on a distributed basis along the length of the core and the winding, thereby providing improved phase inversion and impedance isolation between the RF output lines and an improved wider RF response.

Figure 3:
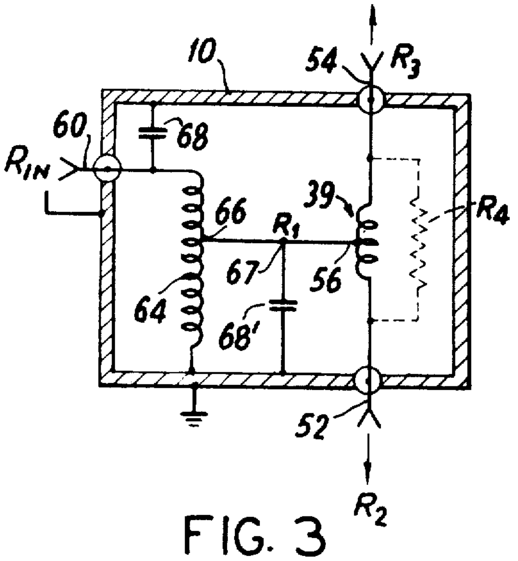
FIG. 3 is a schematic representation of a radio frequency signal splitter of the step-down, step-up type.

FIG. 3 illustrates a device utilizing the hybrid coil 39 of FIG. 2 wherein the RF input line 60 is a coaxial cable of a characteristic impedance of say 75 ohms and the characteristic impedance of the RF output lines 52 and 54 are the same. Since the impedance ratios on the hybrid coil must be of the order of 1 to 2 to 4, it is necessary that the RF input line is coupled to the hybrid coil 39 via a step-down auto transformer 64 to present an impedance at the junction 67 connected to the center terminal 56 of the hybrid coil 39 of about 37 ½ ohms. The core resistance R4 is thereupon made about 150 ohms so that the output impedances to the RF output lines 52 and 54 is a proper 75 ohms. The step-down transformer 64 is of the autotransformer type with one terminal connected to the housing 10 and the other end terminal coupled to the central conductor of the coaxial cable 60 carrying the RF input signal. The stepped-down transformation is obtained by utilizing an intermediate terminal 66 on the step-down transformer 64 and directly connecting it to the center terminal 56 of the hybrid coil 39. A tuning capacitor 68 has been found necessary to be used at the RF input terminal 60 and a corresponding balancing capacitor 68' is coupled to the junction 67 in common with terminals 66 and 56.

Figure 4:
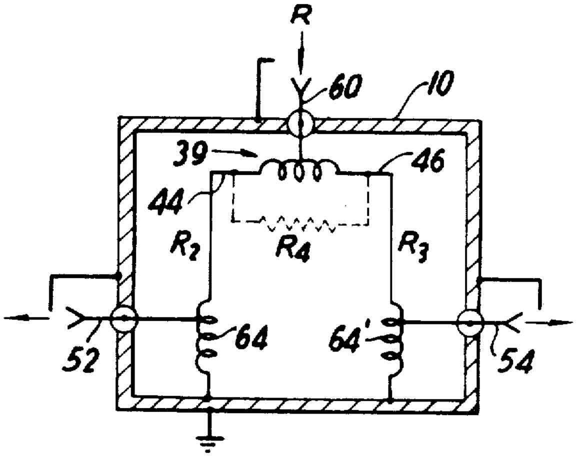
FIG. 4 is a schematic representation of a step-up, step-down splitter utilizing the features of this invention.

The circuitry shown in FIG. 4 is a signal splitter device wherein a pair of step-down transformers 64 -64' are used and a single hybrid coil 39 of the type shown in FIG. 2. The impedance transformation starting from the RF input line 60 is first a step-up transformation at the end terminals 44 and 46 of the hybrid coil and a subsequent impedance step-down transformation at the transformers 64–64' connected to the RF output lines 52–54. If all the RF lines have a characteristic impedance of, say, 75 ohms, then the resistance R4 of the hybrid coil 39 is 300 ohms and the resistances at the end terminals of the hybrid coil, R2 and R3, are each 150 ohms. THe subsequent stepddown impedance transformation as carried out by the transformers 64 -64' produces the desired 75 ohm output at the RF output lines 52 and 54. The advantage of the circuit of FIG. 4 resides in its elimination of capacitive compensation needed for conventional hybrid coils and consequently the signal splitter of FIG. 4 requires no critical control in its fabrication.

It should be realized that in the manufacture of RF impedance matching devices, the utilization of coils and transformers customarily requires fairly exact reproduction of the physical parameters of the coil such as the spacing between turns, the inner and outer diameters of the coil turns, the size of the wire, the location of the coils from the sides of the housing 10, etc. The location of the center terminals also must be properly oriented so that effects from stray capacitances are minimized. The device of FIG. 4 is so well balanced in regard to its impedance matching function that its sensitivity to these physical parameters is greatly reduced, thus being more economical to make.

Figure 5:
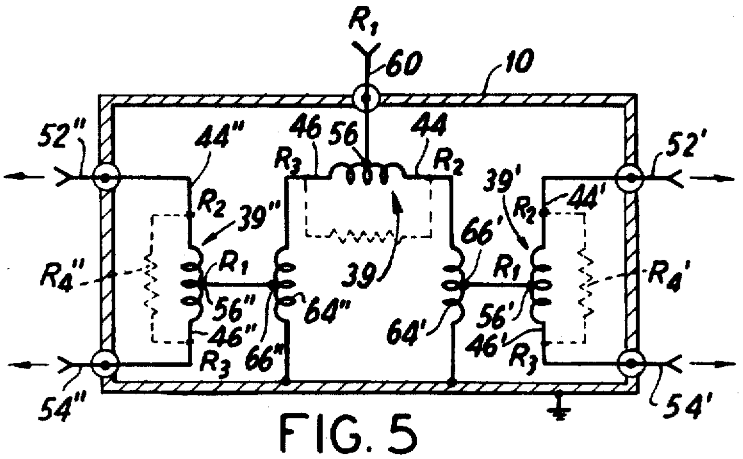
FIG. 5 is a schematic representation of a four-way splitter utilizing three hybrid junctions in accordance with this invention.

In FIG. 5, a four-way signal splitter is described wherein again a coaxial RF input line 60 is connected to the center tap 56 of a hybrid coil 39, which has its end terminals 44 and 46 coupled to a pair of step-down transformers 64'–64'' which in turn have intermediate terminals 66'–66'' connected to center terminals 56'–56'' of hybrid junctions 39'–39''. The end terminals 44', 46' and 44'', 46'' of the hybrid coils 39'–39'' are respectively coupled to the four RF output lines 52', 54' and 52'', 54''. Since the impedances of the RF input line 60 and RF output lines 52', 54', 52'', 54'' are the same, for instance 75 ohms, an impedance step-up to 150 ohms is produced at the end terminals 44, 46 of the hybrid coil 39. This stepped-up impedance must be subsequently reduced by the step-down transformers 64'–64'' to 37 ½ ohms. The hybrid coils 39'–39'' are alike and provide effective RF resistances R4'–R4'' of 150 ohms between their end terminals so that these end terminals in turn may present a 75 ohm matching impedance to the RF output lines.

Figures 6, 7:
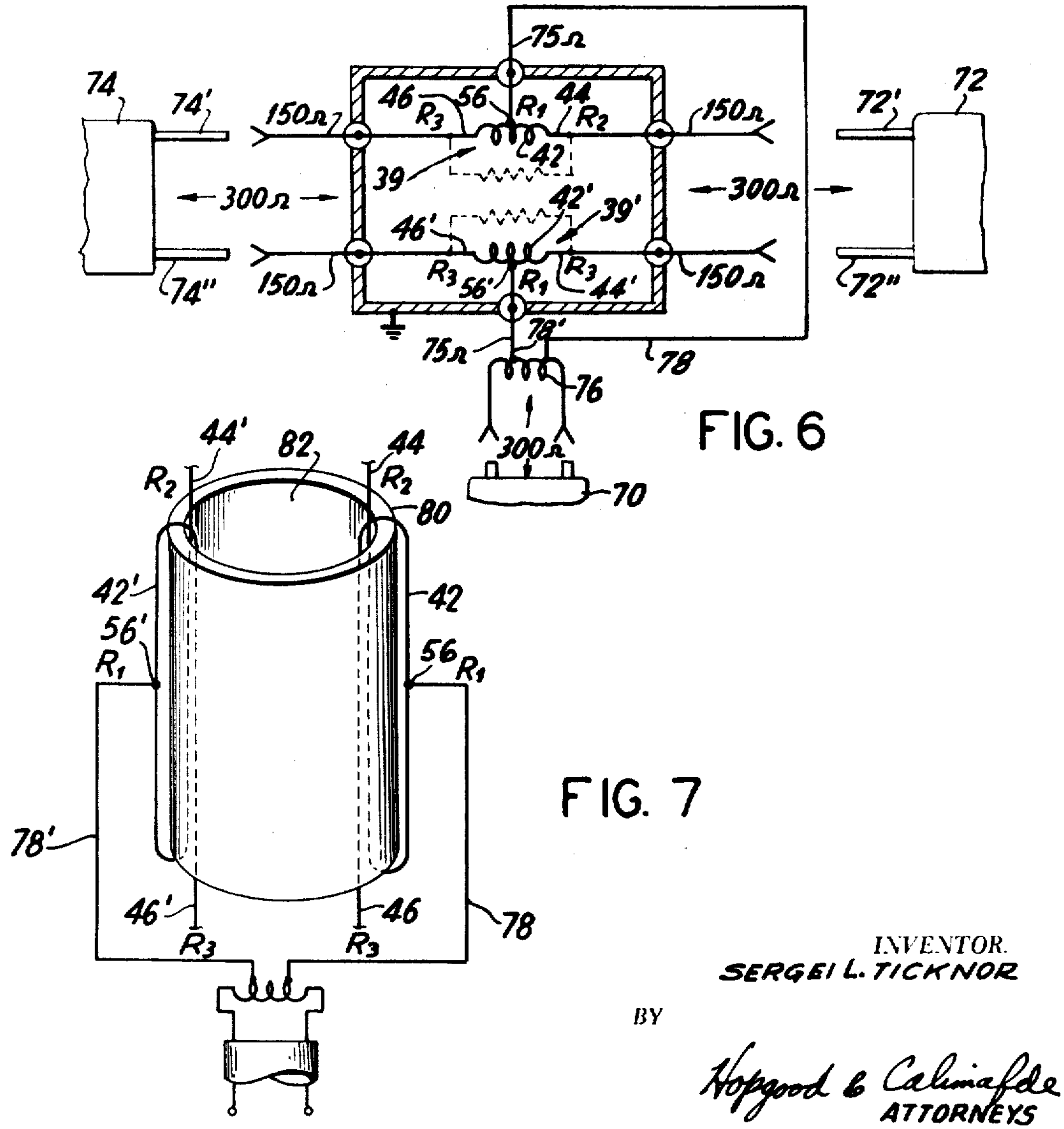
FIG. 6 is a schematic representation of a 300 ohm balanced line radio frequency signal splitter utilizing the features of this invention.
FIG. 7 is a perspective view of a hybrid coil and cylindrical core used in the balanced line radio frequency signal splitter of FIG. 6.

In FIG. 6, a balanced line splitter is shown wherein a conventional 300 ohm TV balanced antenna lead-in wire 70 may be coupled to several TV receivers via balanced RF output lines 72, 74 by first connecting the RF antenna input line 70 to an impedance transformer 76 which produces a 150 ohm balanced line between intermediate terminals. The balanced twin-lead 150 ohm line 78–78' from the step-down transformer 76 is split with one lead 78 coupled to the intermediate center terminal 56 of a hybrid coil 39 such as in FIG. 2, and the other lead 78' coupled to the center terminal 56' of another hybrid coil 39' with end terminals 44–44', 46–46' from each of the hybrid coils 39–39' coupled to RF output lines 72, 74 to present an impedance match therewith.

FIG. 7 illustrates how a balanced line splitter of the type shown schematically in FIG. 6 may be constructed around a single cylindrical core. A core 80 having a bore 82 has located thereon a pair of auto transformer windings 42–42' of, as shown, one-and-a-half turns of a wire of preselected size. The end terminals 44, 46 and 44', 46' of the coils project from opposite axial ends of the core 80 so that the end terminals may be connected to the RF output lines as shown in FIG. 6. Intermediate terminals 56–56' are selected at a core location which is substantially axially centered and the wire 78–78' are coupled to the impedance transformer 76 as shown schematically. Typically in the hybrid coils of FIG. 7, the core lengths are about 0.3 inches. The isolation between the RF output lines would be, in such situation, better than 16 db.

Figure 8:
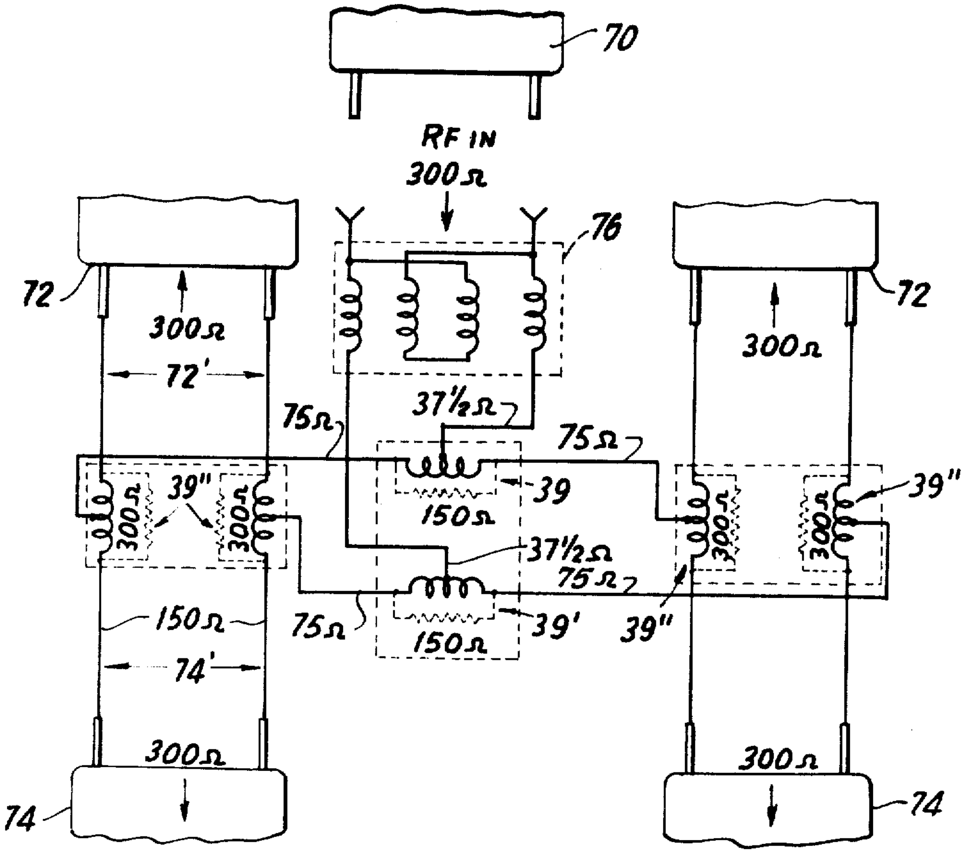
FIG. 8 is a schematic representation of a four-way 300ohm balanced line radio signal splitter utilizing four transformers with six hybrid junctions.

In FIG. 8, a 300 ohm four-way signal splitter is schematically shown wherein six hybrid coils according to this invention are used and one step-down impedance transformer for coupling a balanced two-lead 300 ohm RF input line 70 to four balanced twin-lead 300 ohm RF output lines 72, 74. All of the RF lines have a characteristic impedance of 300 ohms so that the step-down transformer 75 coupled to the RF input line provides 37 ½ ohm impedance on a line coupled to the intermediate terminals of the hybrid coils 39–39' each of which have an effective resistance R4 of 150 ohms coupled across the end terminals. The end terminals of the hybrid junctions 39–39' are then connected to the center intermediate terminals of four other like hybrid junctions 39'', each of which has a 300 ohm effective resistance across its end terminals so that the RF output lines may be matched by coupling to a pair of end terminals of hybrid coils. In FIG. 8, the hybrid coil 39'' may be paired with each pair connected in the manner shown in FIG. 7. The isolation provided in the device of FIG. 8 is better than 30 db over a frequency range from 54 to 890 MHz.

Having thus described the invention with numerous embodiments, it should be realized that variations may be practiced by one skilled in the art without deviating from the spirit of the invention. For instance, one might utilize the hybrid coils of this invention as shown connected in FIG. 6 but without the impedance step-down transformer. In such case the device will be mismatched from the RF input line viewpoint but the isolation may still reach 15 db because of the inherent high quality performance of the hybrid coil of this invention.

While the principles of the invention have been described in connection with specific apparatus, it is to be clearly understood that this description is made only by way of example and not as a limitation to the scope of the invention as set forth in the objects thereof.

I claim:

1. A hybrid radio frequency signal splitter for impedance matching of coaxial RF input line to a pair of coaxial RF output lines over a wide preselected frequency band, comprising a radio frequency cylindrical ferrite core having a substantially stable resistivity over the preselected frequency band, said core having an axial bore formed therein and having a preselected axial dimension, such that said core is effective to define an equivalent radio frequency resistance bearing a predetermined ratio to the characteristic impedance of the RF input and output lines, a radio frequency coil wound about the core for inductive coupling therewith, said coil having a pair of end terminals and an intermediate terminal effectively electrically located between the end terminals, said equivalent resistance being effectively defined across said end terminals, said end terminals and intermediate terminal being arranged for coupling to the RF input and RF output lines to provide impedance matching therebetween with substantial RF isolation between said RF output lines, and a step-down transformer having a pair of end terminals and an intermediate terminal, said intermediate terminal being coupled to the intermediate terminal of said coil, the RF lines each having like characteristic impedances, the end terminals of said coil being arranged for coupling to individual RF output lines and the end terminals of said step-down transformer being arranged for coupling to the coaxial input RF line, said radio frequency resistance of said core being selected to be commensurate with about twice the characteristic impedance of the RF output lines.

2. A hybrid radio frequency signal splitter for impedance matching of an RF balanced twin-lead input line to several like RF balanced output lines over a wide preselected radio frequency band with isolation between RF output lines, comprising a ferrite core having a substantially stable resistivity over the preselected frequency band with said core sized to produce a radio frequency resistance bearing a predetermined ratio to the characteristic impedances of the balance input and output lines, a first autotransformer winding having a pair of end terminals and an intermediate terminal with the first winding inductively coupled to the core and with the core RF resistance effectively coupled across the end terminals, a second autotransformer winding having a pair of end terminals and an intermediate terminal with the second winding inductively coupled to the core and with the RF resistance of the core effectively coupled across the end terminals, an impedance transformer having a pair of end terminals arranged for coupling to a first balanced twin-lead RF line and further having a pair of intermediate terminals coupled respectively to the intermediate terminals of the first and second windings, with one of each end terminal of the first and second windings arranged for coupling to a first twin-lead balanced output line, and with the other end terminals of the first and second windings arranged for coupling to a second twin-lead balanced output line.

3. The device as recited in claim 2 wherein the RF ferrite core is a cylinder with a central bore between the cylinder ends and wherein said first and second windings are wound with a preselected number of substantially axially parallel turns about the core with the end terminals of each winding protruding from opposite ends of the core and with the intermediate terminals formed at radially outer parts of windings at selected axial core locations and with the axial length of the core selected to provide said predetermined RF resistance effectively across the end terminals of the windings.

4. The device as recited in claim 2 wherein said RF resistance has a value about equal to that of the characteristic impedances of the balanced RF twin-lead lines.

5. The device as recited in claim 2 wherein said RF resistance has a value about equal to that of the characteristic impedance of the balanced RF twin-lead output lines being coupled to the end terminals of the windings and about twice the characteristic impedance of the balanced RF input line coupled to the intermediate taps of the impedance transformer.

6. The device as recited in claim 5 wherein said impedance transformer provides across its intermediate terminals a characteristic impedance of about one-half of the characteristic impedance of a balanced line coupled to its end terminals.

7. A hybrid radio frequency signal splitter for impedance matching of an RF coaxial input line to four coaxial RF output lines over a wide preselected frequency band, comprising three radio frequency coils, each wound inductively about selected ones of a plurality of radio frequency ferrite cores each of said cores having a substantially stable resistivity over the preselected frequency band with said core being sized to produce a radio frequency resistance bearing a predetermined ratio to the characteristic impedances of the coaxial RF input and output lines, each of said coils having a pair of end terminals and an intermediate terminal effectively electrically located between the end terminals with individual end terminals of two coils respectively coupled to said four coaxial RF output lines, a pair of impedance step-down autotransformers, each having a pair of end terminals and an intermediate terminals, the intermediate terminal of each transformer being respectively coupled to the intermediate terminals of two of said coils, each end terminal of the step-down transformers being respectively coupled to the end terminals of the third coil, said third coil being arranged to have its intermediate terminal coupled to the coaxial RF input line, said step-down transformers providing about a two-to-one impedance change from end terminal connected inputs to intermediate terminal connected outputs, and said RF resistance of the core inductively coupled to the third coil being selected to about four times the characteristic impedance of the RF input line and with the RF resistance of said core inductively coupled to the first and second coils being selected to provide an RF resistance of about twice the characteristic impedance of each of the coaxial RF output lines.

8. A hybrid radio frequency signal splitter for impedance matching of a coaxial RF input line to a pair of coaxial RF output lines over a wide preselected frequency band, comprising a radio frequency cylindrical ferrite core having a substantially stable resistivity over the preselected frequency band, said core having an axial bore formed therein and having a preselected axial dimension, such that said core is effective to define an equivalent radio frequency resistance bearing a predetermined ratio to the characteristic impedance of the RF input and output lines, a radio frequency coil wound about the core for inductive coupling therewith, said coil having a pair of end terminals and an intermediate terminal effectively electrically located between the end terminals, said equivalent resistance being effectively defined across said end terminals, said end terminals and intermediate terminal being arranged for coupling to the RF input and RF output lines to provide impedance matching therebetween with substantial RF isolation between said RF output lines, a pair of impedance step-down transformers each having a pair of end terminals and an intermediate terminal, said intermediate terminals of said step-down transformers being coupled to the coaxial output RF lines and an end terminal of each of said step-down transformers being coupled to the end terminals of said coil inductively wound to said core, the intermediate terminal of said coil being coupled to the coaxial RF input line, said radio frequency core resistance being selected to exceed the characteristic impedances of the RF input and output lines by a factor of about four.

* * * * *